US011511972B1

(12) United States Patent
Oren et al.

(10) Patent No.: US 11,511,972 B1
(45) Date of Patent: Nov. 29, 2022

(54) SYSTEM FOR TRACKING LIFTING EVENTS AT A CONSTRUCTION SITE

(71) Applicant: Versatile, Inc., San Francisco, CA (US)

(72) Inventors: Ran Oren, San Francisco, CA (US); Meirav Oren, San Francisco, CA (US)

(73) Assignee: Versatile, Inc., San Francisco, CA (US)

( * ) Notice: Subject to any disclaimer, the term of this patent is extended or adjusted under 35 U.S.C. 154(b) by 0 days.

(21) Appl. No.: 17/828,730

(22) Filed: May 31, 2022

Related U.S. Application Data

(63) Continuation-in-part of application No. 17/339,853, filed on Jun. 4, 2021, which is a continuation of application No. 17/184,471, filed on Feb. 24, 2021, which is a continuation of application No. 17/033,579, filed on Sep. 25, 2020, now Pat. No. 10,968,084.

(60) Provisional application No. 62/906,703, filed on Sep. 26, 2019, provisional application No. 63/195,504, filed on Jun. 1, 2021.

(51) Int. Cl.
*B66C 13/00* (2006.01)
*B66C 13/16* (2006.01)

(52) U.S. Cl.
CPC .................................. *B66C 13/16* (2013.01)

(58) Field of Classification Search
CPC ........... B66C 1/34; B66C 1/40; B66C 13/063; B66C 13/085; B66C 13/16; B66C 13/22; B66C 13/46; B66C 15/065; B66D 1/485; G01L 5/10; G01G 19/18
See application file for complete search history.

(56) References Cited

U.S. PATENT DOCUMENTS

| 5,117,992 A | 6/1992 | Simkus, Jr. et al. |
| 5,780,826 A | 7/1998 | Hareyama et al. |
| 2005/0247657 A1 | 11/2005 | Sparenborg et al. |

(Continued)

FOREIGN PATENT DOCUMENTS

| CA | 2800086 A1 * | 6/2013 | ............. G01S 13/04 |
| CN | 109314732 B * | 3/2021 | ............. B65H 63/00 |

(Continued)

OTHER PUBLICATIONS

Final Office Action for U.S. Appl. No. 15/607,897 dated Mar. 7, 2019, 13 pages.

(Continued)

*Primary Examiner* — Emmanuel M Marcelo
(74) *Attorney, Agent, or Firm* — Run8 Patent Group, LLC; Peter Miller; Alexander Rodriguez

(57) ABSTRACT

One variation for a system for tracking lifting events at a construction site includes: a chassis configured to couple to a crane block of a crane at a construction site. The system further includes a first idler assembly including a first cable idler, a first idler arm, and a first position sensor coupled to the first idler arm. The first idler arm supports the first cable idler on a first side of the chassis and biases the first cable idler inwardly toward a first cable loop coupled to the crane block. Additionally, the system includes a controller configured to, during a lift event: read a first position value from the first position sensor; predict a weight of the load carried by the crane block based on the first position value; and generate a lift event record containing the weight of the load carried by the crane block.

20 Claims, 8 Drawing Sheets

(56) References Cited

U.S. PATENT DOCUMENTS

| | | |
|---|---|---|
| 2007/0235404 A1 | 10/2007 | Catanzaro |
| 2008/0017601 A1 | 1/2008 | Neupert et al. |
| 2010/0044332 A1 | 2/2010 | Cameron |
| 2010/0070179 A1 | 3/2010 | Cameron |
| 2010/0237641 A1 | 9/2010 | Drent et al. |
| 2011/0187548 A1 | 8/2011 | Maynard et al. |
| 2013/0096731 A1 | 4/2013 | Tamari et al. |
| 2013/0103271 A1 | 4/2013 | Best et al. |
| 2013/0146556 A1 | 6/2013 | Cameron et al. |
| 2013/0245816 A1 | 9/2013 | Langer et al. |
| 2014/0263142 A1 | 9/2014 | Billiot et al. |
| 2015/0161872 A1 | 6/2015 | Beaulieu et al. |
| 2015/0242769 A1 | 8/2015 | Kezeu |
| 2016/0034608 A1 | 2/2016 | Delplace |
| 2016/0107866 A1 | 4/2016 | Schoonmaker et al. |
| 2017/0008739 A1 | 1/2017 | Nguyen et al. |
| 2018/0080198 A1 | 3/2018 | Machida et al. |
| 2018/0319630 A1 | 11/2018 | Dayrell |
| 2018/0346294 A1 | 12/2018 | Shely et al. |
| 2019/0302794 A1 | 10/2019 | Kean et al. |
| 2020/0002140 A1* | 1/2020 | Ijadi-Maghsoodi ..... B66D 1/22 |

FOREIGN PATENT DOCUMENTS

| | | | | |
|---|---|---|---|---|
| KR | 101867735 B1 * | 12/2016 | ............. | G01G 19/18 |
| WO | WO-2014081378 A1 * | 5/2014 | ............. | B66C 13/16 |
| WO | 2017108053 A1 | 6/2017 | | |
| WO | 2019151876 A1 | 8/2019 | | |

OTHER PUBLICATIONS

Hilit Yanai Levinson, "The Internet's stuff on the Lever; Intel Gix Promises Avoid the next disaster", Retrieved from https://www.globes.co.il/news/article.sapx?did+100117719, Published Feb. 19, 2017; 2 pages.

International Search Report and Written Opinion for International Patent Application No. PCT/IL2018/050547, dated Sep. 4, 2018; 12 pages.

International Search Report and Written Opinion for International Patent Application No. PCT/US2020/052931 dated Jan. 11, 2021; 7 pages.

Levy, Ruti, "The Startups That Connect the Bulldozers to the Cloud" Retrieved from https://www.haaretz.com/israel-news/business/Magazine-startups-connect-bulldozers-to-the-cloud-1.543362, Published on Feb. 28, 2017; 2 pages.

Li, et. al., "Integrating real time positioning systems to improve blind lifting and loading crane operations", retrieved from https://eprints.qut.edu.au/60767/7/60767.pdf, 2013, 32 pages.

Non-final Office Action for U.S. Appl. No. 15/607,897 dated Sep. 21, 2018; 10 pages.

Non-final Office Action for U.S. Appl. No. 15/607,897 dated Oct. 18, 2019; 18 pages.

Notice of Allowance for U.S. Appl. No. 17/033,579 dated Nov. 24, 2020; 10 pages.

Notice of Allowance for U.S. Appl. No. 16/853,577 dated May 26, 2022; 11 pages.

* cited by examiner

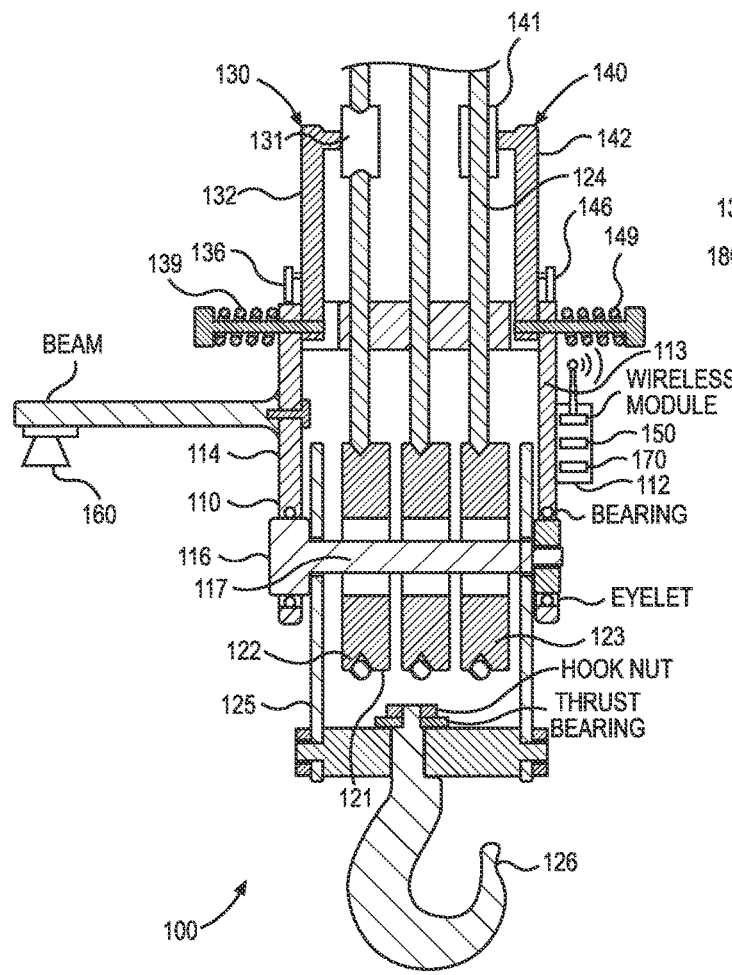
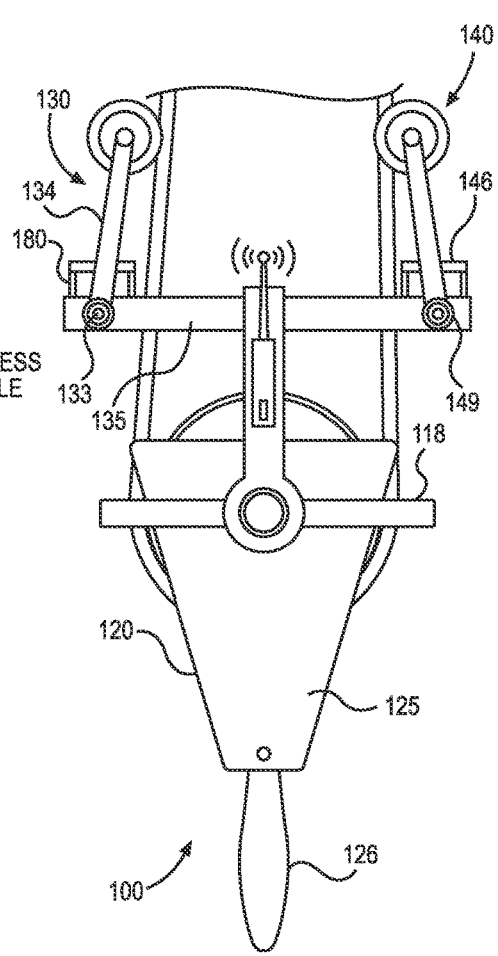
*FIGURE 1A*  *FIGURE 1B*

SYSTEM FOR TRACKING LIFTING EVENTS AT A CONSTRUCTION SITE

CROSS-REFERENCE TO RELATED APPLICATIONS

This application is a Continuation-In-Part of U.S. patent application Ser. No. 17/339,853, filed on 4 Jun. 2021, which is incorporated in its entirety by this reference. This application claims priority to U.S. Provisional Patent Application No. 63/195,504, filed on 1 Jun. 2021, which is incorporated in its entirety by this reference.

TECHNICAL FIELD

This invention relates generally to the field of construction management and more specifically to a new and useful system for tracking lifting events at a construction site in the field of construction management.

BRIEF DESCRIPTION OF THE FIGURES

FIGS. 1A and 1B are schematic representations of a system.

DESCRIPTION OF THE EMBODIMENTS

Figure 2:
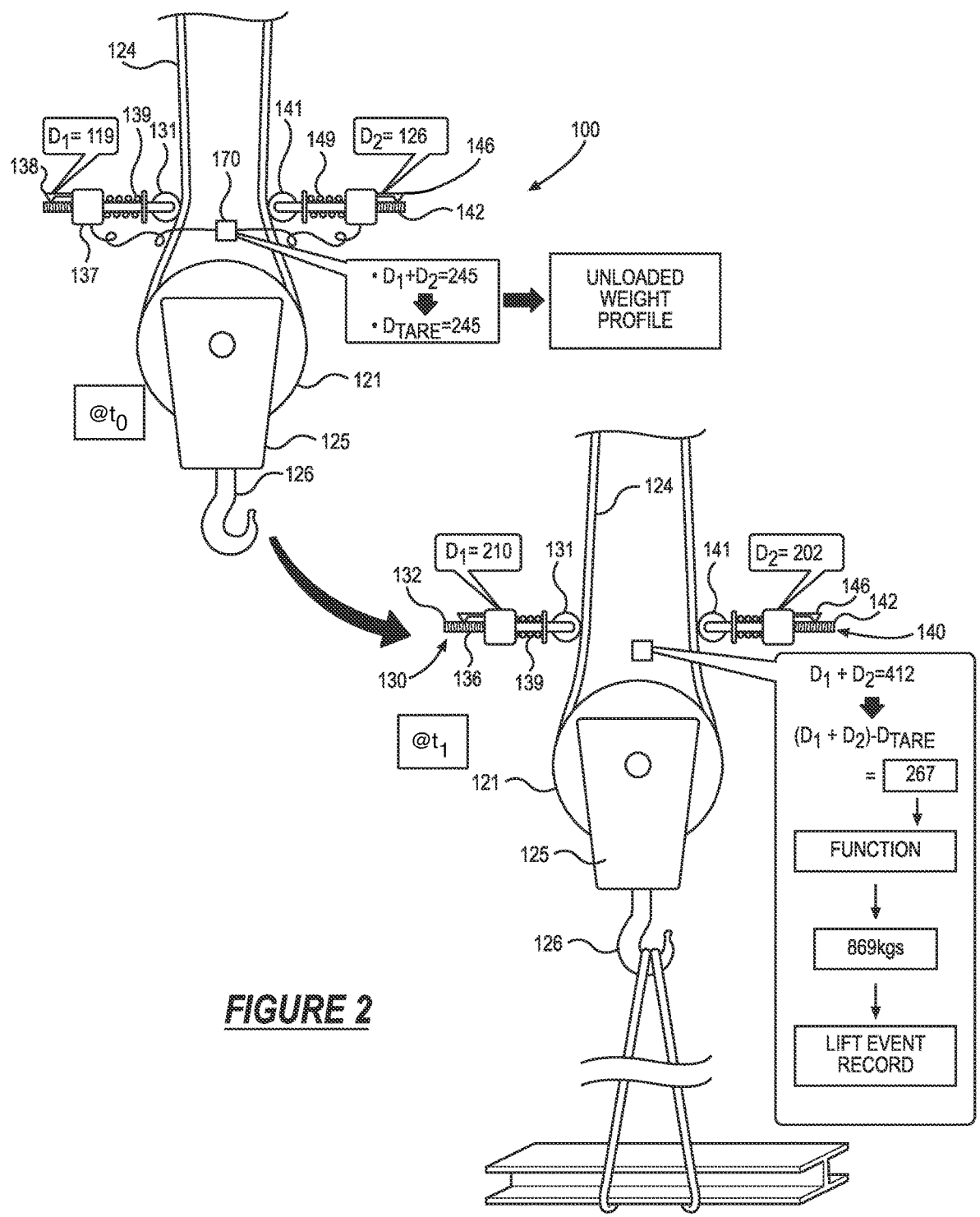
FIG. 2 is a flowchart representation of one variation of the system.
Figure 3:
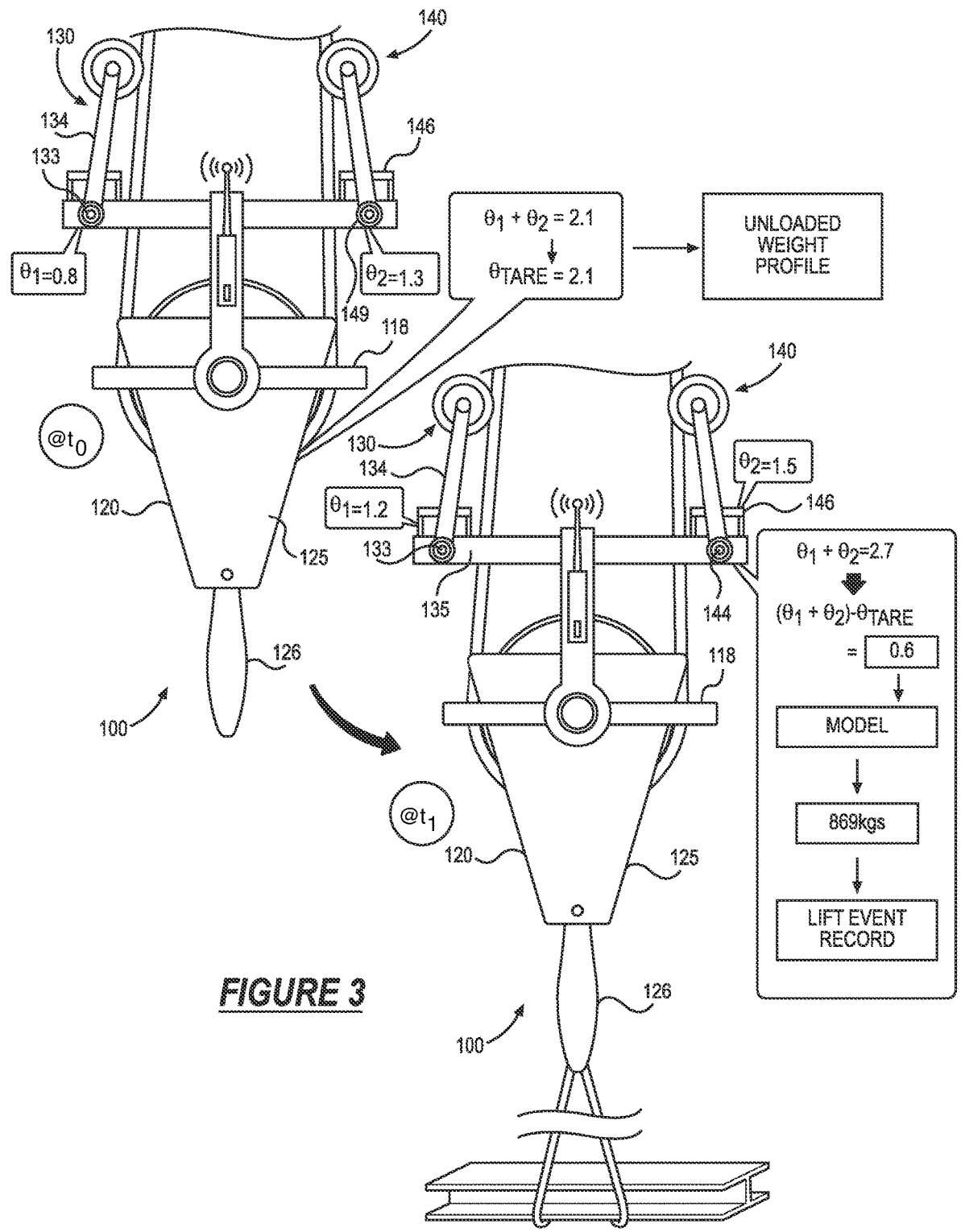
FIG. 3 is a flowchart representation of another variation of the system.
Figure 4:
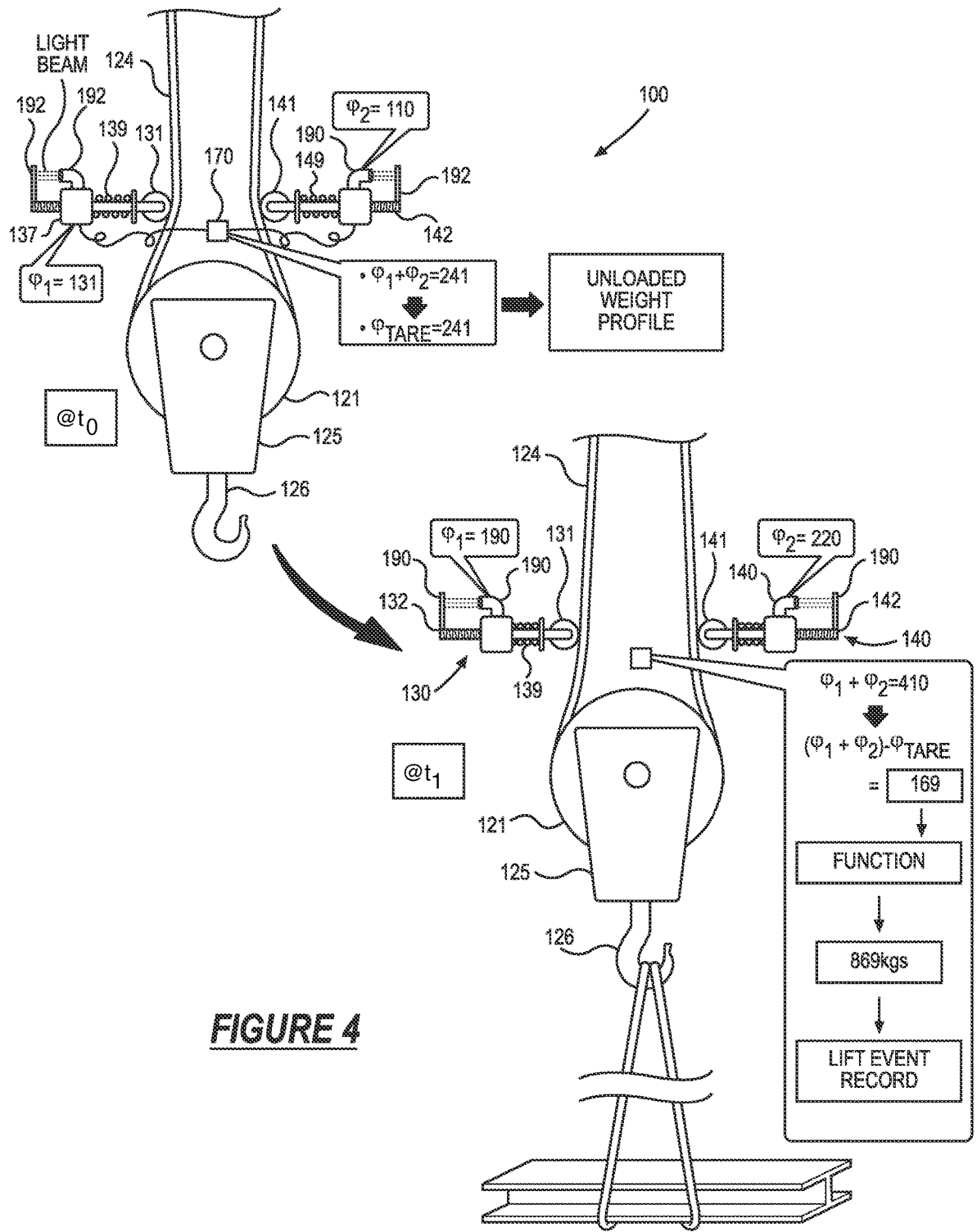
FIG. 4 is a flow chart representation of another variation of the system.
Figure 5:
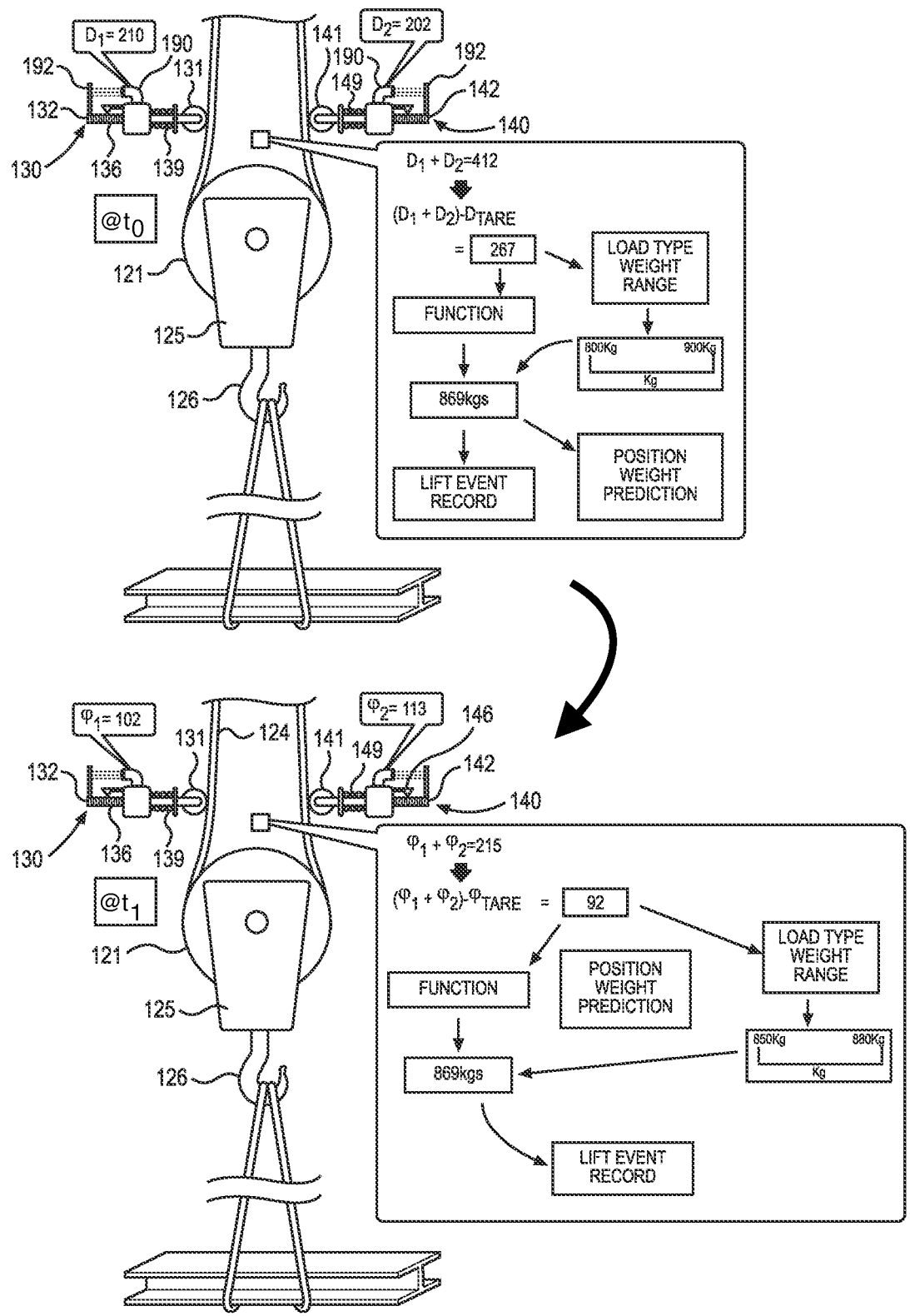
FIG. 5 is a flow chart representation of another variation of the system.
Figure 6:
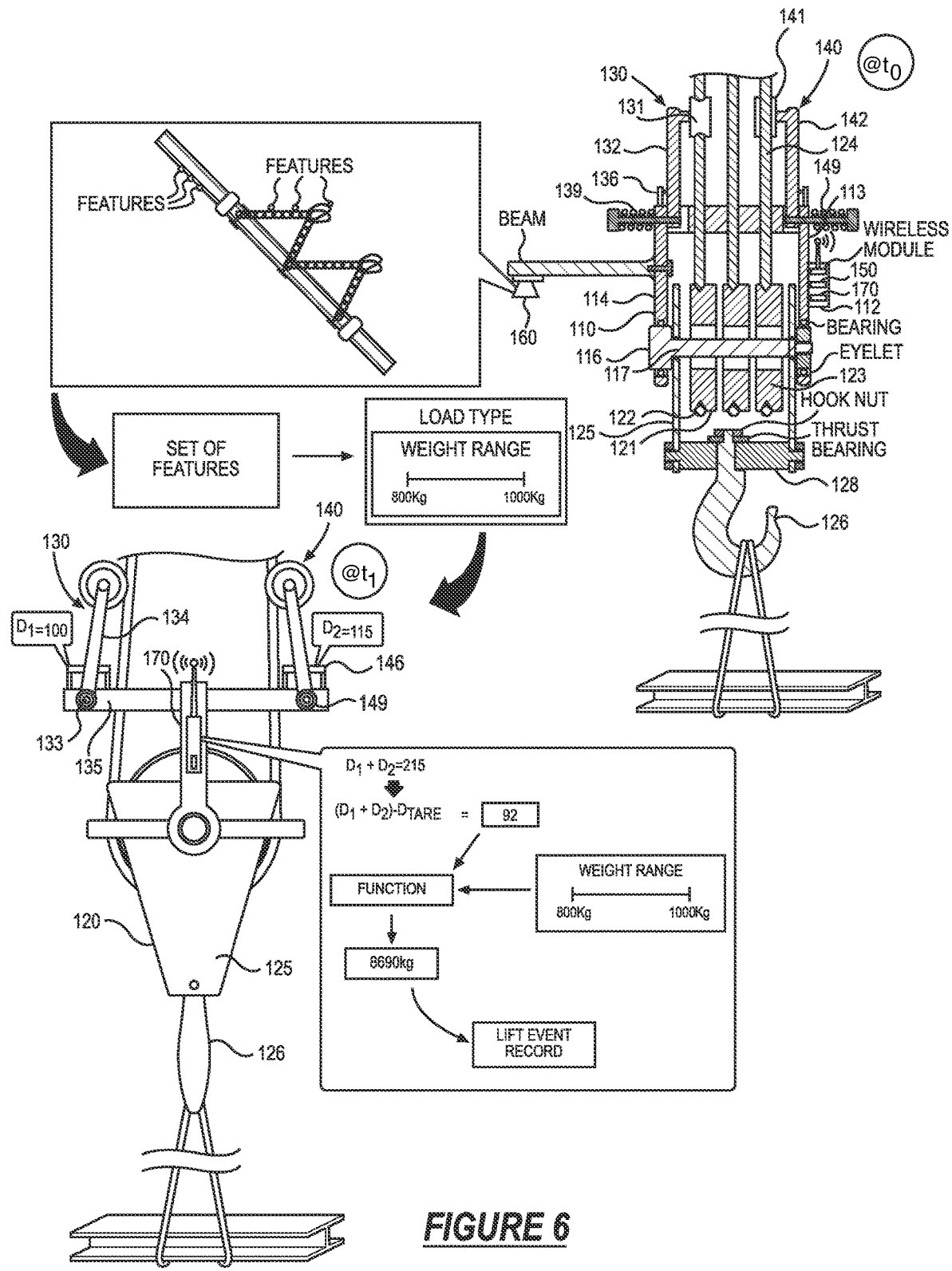
FIG. 6 is a flow chart representation of another variation of the system.
Figure 7:
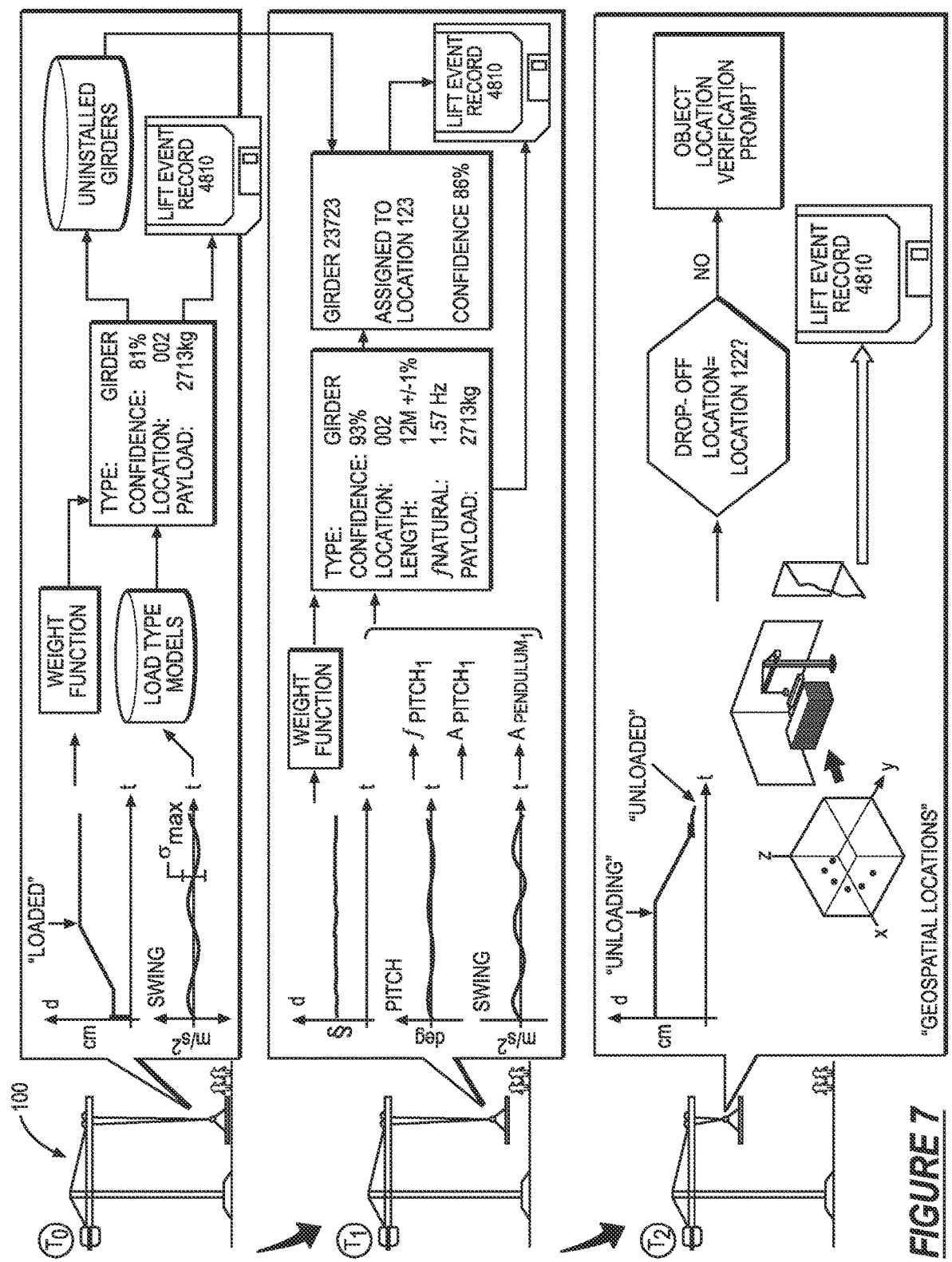
FIG. 7 is a flow chart representation of another variation of the system.
Figure 8:
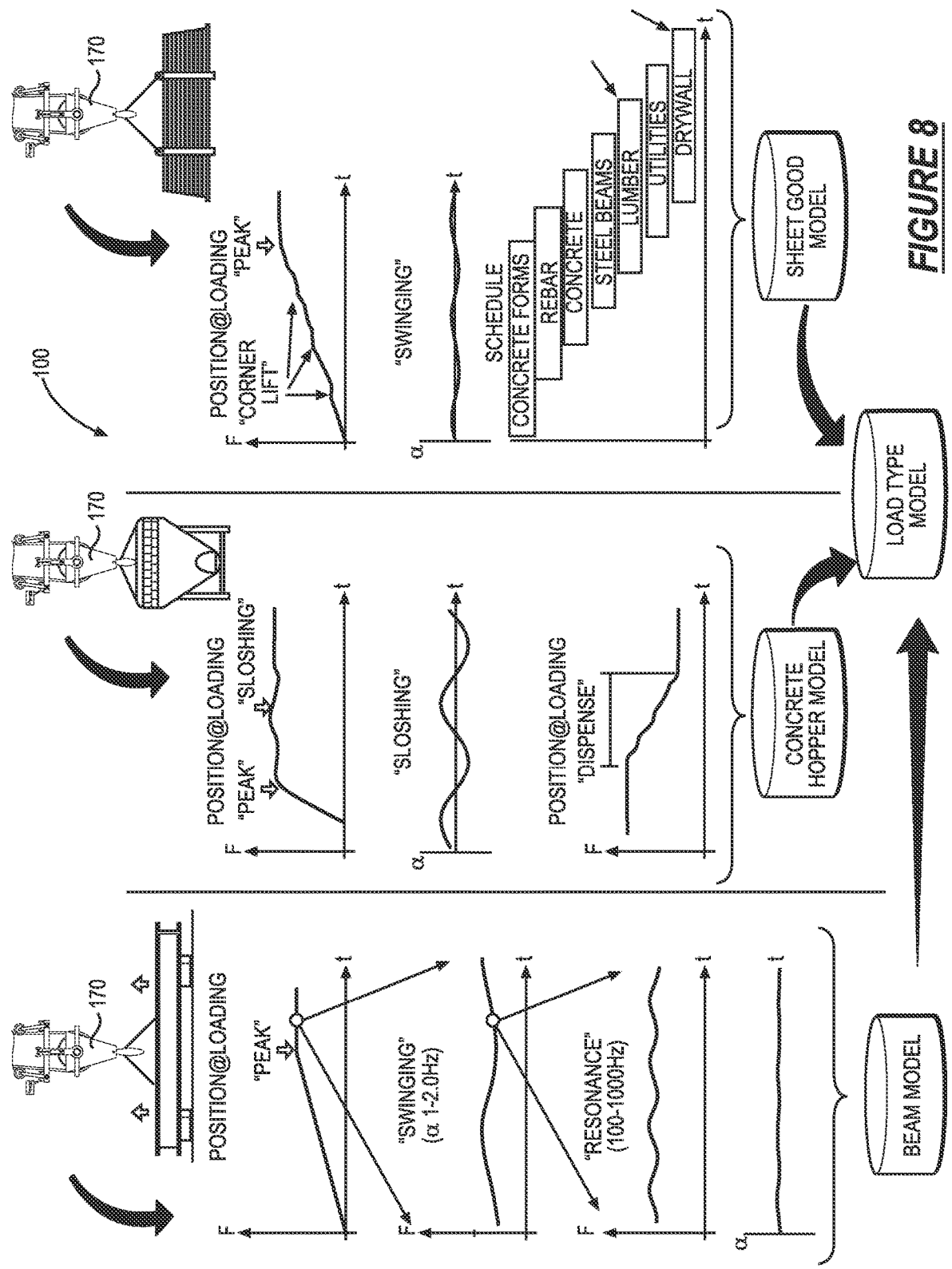
FIG. 8 is a flow chart representation of another variation of the system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1A and 1B, a system 100 includes: a chassis 110; a set of idler assembles; a motion sensor 150; and a controller 170. The chassis 110 is configured to couple (or "retrofit") to a crane block 120 over a set of sheaves 121 and side plates 125 of the crane block 120. Each idler assembly 130 includes: a cable idler 131; an idler arm 132 that supports the cable idler 131 on the chassis 110 and biases the cable idler 131 inwardly toward a cable loop 124 coupled to a sheave in the set of sheaves 121; and a position sensor 136 coupled to the idler arm 132. The motion sensor 150 is coupled to the chassis 110. The controller 170 is coupled to the chassis 110 and is configured to: interpret a distance between the cable idlers 131 and 141 based on outputs of the position sensors 136 and 146; interpret a weight of a load carried by the block based on the distance between the cable idlers 131 and 141; predict a type of the load based on a signal output by the motion sensor 150; and generate a lift event record containing the weight of the load and the type of the load.

The system 100 can further include: a battery; a wireless communication module; an optical sensor 160 (e.g., a camera); an altimeter; and/or a geospatial position sensor 136; etc.

One variation of the system 100 for tracking lifting events at a construction site includes a chassis 110 configured to couple to a crane block 120 of a crane at a construction site and located over a set of sheaves 121 and side plates 125 of the crane block 120. The system 100 further includes a first idler assembly 130 including, a first cable idler 131, a first idler arm 132, and a first position sensor 136 coupled to the first idler arm 132. The first idler arm 132 supports the first cable idler 131 on a first side of the chassis 110 and biases the first cable idler 131 inwardly toward a first cable loop 124 coupled to a first sheave 122 in the set of sheaves 121 of the crane block 120. The system 100 further includes a motion sensor 150 coupled to the chassis 110. Additionally, the system 100 includes a controller 170 configured to, during a lift event: read a first set of motion values from the motion sensor 150; and interpret a load type, from a set of load types, for the load carried by the crane based on the first set of motion values. Furthermore, during the lift event, the controller 170 can: read a first position value from the first position sensor 136; predict a weight of the load carried by the crane block 120 based on the first position value; and generate a lift event record containing the load type and the weight of the load carried by the crane block 120.

Another variation for a system 100 for tracking lifting events at a construction site includes a chassis 110 configured to couple to a crane block 120 of a crane at a construction site. This variation of the system 100 includes a cable idler 131, a spring 139, and a position sensor 136. The cable idler 131 is configured to ride along a cable loop 124 of the crane block 120 and coupled to the chassis 110. The spring 139 biases the cable idler 131 inwardly toward a cable loop 124 coupled to a sheave of the crane block 120. The position sensor 136 is coupled to the idler arm 132 and includes: a scale 138 arranged on a distal end of the idler arm 132; and a linear encoder 137 configured to output position values of the scale 138 corresponding to changes in transverse position of the first cable idler 131 over the chassis 110 resulting from changes in weight carried by the crane block 120. This variation of the system 100 further includes a controller 170 configured to, during a lift event: read a first position value from the first position sensor 136; predict a weight of a load carried by the crane block 120 based on deviation of the first position value from a baseline position value; and generate a lift event record containing the weight of the load carried by the crane block 120.

2. Applications

Generally, the system 100 can be retrofit onto an existing crane hook 126 (or "block") in order to enable autonomous weight detection, load identification, and lift event record generation at the crane hook 126 with minimal or no disassembly of or irreversible modification to the crane hook 126. In particular, the system 100 can include: a set of idler assemblies that contact cable loops 124 running through sheaves of the crane hook 126; and a controller 170 that interprets tensile forces through these cable loops 124 based on positions of these idler assemblies and estimates weights of loads carried by the crane hook 126 based on these tensile forces. The system 100 can also include a motion sensor 150

(e.g., an inertial measurement unit, or "IMU"); and the controller 170 can implement template matching, artificial intelligence, and/or other techniques to predict types of loads (e.g., rebar, steel girders, concrete hoppers, sheet goods) carried by the crane hook 126 based on motion signals output by the motion sensor 150. The system 100 can additionally or alternatively include an optical sensor 160 (e.g., a color camera) arranged on and facing downwardly from the chassis 110; and the controller 170 can implement template matching, computer vision, and/or other techniques to identify types of loads carried by the crane hook 126 based on features extracted from images captured by the optical sensor 160. The controller 170 can thus compile lift event data—including a weight of a load, a type of the load, a path of the load, and/or motion of the load, etc.—thus derived from these sensors into a sequence of lift event records representing flow of tools and materials through a construction site.

In particular, the controller 170 can: derive the weight of a load carried by the crane hook 126 based on tension in cable loops 124 supporting the crane hook 126; and then implement methods and techniques described in U.S. patent application Ser. No. 17/033,579 to predict or identify a type of the load and to compile these and other data into a lift event record for the load. For example, once installed on a crane hook 126, the system 100 can be carried by a crane and manipulated by the crane and construction staff to move tools and materials within a construction site. The controller 170 (and/or a remote computer system) can then: access cable tension, motion, optical, and/or geospatial location data from the system 100; interpret weights and types of these loads carried by the crane based on these data; and generate lifting event records representing types, magnitudes, locations, and trajectories of these loads moving throughout the construction site over time.

In this example, the system 100 (or the remote computer system) can implement template matching, deep learning, and/or artificial intelligence techniques to distinguish different types of objects lifted by the crane hook 126, such as including: a long steel beam based on low-amplitude resonant vibrations between 10 Hz and 1000 Hz detected by the motion sensor 150 once the position sensors 136 and 146 indicate an equilibrated load carried by the crane hook 126 (e.g., indicating that the beam is fully lifted); a bundle of loose rebar based on moderate-amplitude resonant vibrations between 0.1 Hz and 5 Hz detected by the motion sensor 150 once this bundle is fully lifted; and a loaded concrete mixer based on high-amplitude oscillations between 0.1 Hz and 2 Hz (i.e., from wet concrete "sloshing" inside a drum in the concrete mixer) and lower-amplitude, higher-frequency machine vibrations (i.e., from a motor rotating the drum) detected by the motion sensor 150 once the concrete mixer is fully lifted.

In the foregoing examples, the system 100 (or the remote computer system) can generate a lifting event for each of these loads. For each of these lifting events, the system 100 can also store: a peak weight derived from a peak tension detected by the position sensors 136 and 146 in the idler assemblies during the lifting event; geospatial locations output by the geospatial position sensor 136 when the load was first detected by the system 100 (e.g., based on an increase in tension on the cable loops) and when the load was later unloaded (e.g., based on a decrease in tension on the cable loops to a tare tension); and altitudes output by an altimeter in the system 100 when the load was first detected and then unloaded at the crane hook 126.

The system 100 (and/or the remote computer system) is described herein as configured to retrofit onto an existing crane hook 126 to integrate load detection and recognition faculties into the crane hook 126.

However, elements of the system 100 described herein can be integrated directly into a new crane hook 126 to form an "integrated smart hook" configured to detect and recognize loads loaded onto the crane hook 126 throughout operation at a construction site.

3. Chassis

The chassis 110 is configured to couple to (e.g., "retrofit" onto or integrate into) a crane block 120 over a set of sheaves 121 and side plates 125 of the crane block 120.

In one implementation, the chassis 110 includes: a housing 112; a first vertical section 113 that extends downward from the housing 112 and defines a first eyelet configured to pivotably couple to the first side of the center pin 116 extending through the first side plate 125 of the block; and a second vertical section 114 that similarly extends downward from the housing 112 opposite the first vertical section 113 and defines a second eyelet configured to pivotably couple to the second side of the center pin 116 extending through the second side plate 125 of the block. In this implementation, the chassis 110 can also include a first bearing and a second bearing: mounted in the first and second eyelets, respectively; and configured to mate directly with the center pin 116 (e.g., install around ends of the center pin 116 passing through the side plates 125 of the block) to pivotably locate the chassis 110 about the center pin 116 and to constrain the chassis 110 on the block in five degrees of freedom.

Alternatively, in this implementation, the chassis 110 can include a pair of bearing blocks (e.g., with ball, tapered, or needle bearings; with bushings) mounted in the first and second eyelets. These bearing blocks can thus be fastened (e.g., with threaded fasteners) or otherwise coupled (e.g., magnetically) to the first and second side plates 125 such that bearings in the bearing blocks are concentric with the center pin 116, thereby pivotably locating the chassis 110 about the center pin 116 and constraining the chassis 110 on the block in five degrees of freedom.

Therefore, because the chassis 110 is pivotably located about the center pin 116 of the block, the attitude of the chassis 110 may be decoupled from pitch motion of the block (if the cable loops 124 are tensioned) such that: the cable idlers 131 and 141 maintain contact with the same regions of their corresponding cable loops 124 even if the block is pitching under motion of the crane, due to uneven loading, or when the block is drawn by guidelines; and the controller 170 predicts a consistent tension on the cable loops 124 and a consistent load weight even under such block motion conditions.

Furthermore, in this implementation, the chassis 110 can include a cage 118 extending horizontally around the block (e.g., around the side plates 125 and sheaves of the block through a horizontal plane through the center pin 116) to connect the distal ends of the first and second vertical section 114s of the chassis 11o. For example, the cage members 118 can extend longitudinally fore and aft from the eyelets of the first and second vertical sections of the chassis no. In this example, a pair of tie bolts (and shims) can be installed through and can connect the distal ends of the cage members 118 and can thus function to prevent the eyelets from slipping off of the ends of the center pin 116 without modification or replacement of the center pin 116 or side plates 125.

4. Idler Assemblies

The idler assemblies are arranged on the chassis 110, include cable idlers 131 and 141 that ride along one or more cable loops 124 running on sheaves in the block, and include sensors that output signals representative of tension on the cable loops 124.

In one implementation, the system 100 includes: a first idler assembly 130 arranged on a ventral side of the chassis 110; and a second idler assembly 140 arranged on a dorsal side of the chassis 110 opposite the first idler assembly 130. In this implementation, the first idler assembly 130 can include: a first cable idler 131 (e.g., a bushing-mounted wheel); a first idler arm 132 coupled to the ventral side of the chassis 110 (e.g., the ventral side of the housing 112) and configured to locate the first cable idler 131 over the chassis 110; a first spring 139 configured to bias the cable idler 131 against a section of cable above the block; and a first position sensor 136 configured to detect a position (e.g., an angular or linear position) of the first idler arm 132 on the chassis 110. Similarly, the second idler assembly 140 can include: a second cable idler 141; a second idler arm 142 coupled to the dorsal side of the chassis 110 opposite the first idler arm 132 and configured to locate the second cable idler 141 over the chassis 110; a second spring 149; and a second position sensor 146 configured to detect a position of the second idler arm 142 on the chassis 110.

In this implementation, the springs 139 and 149 and the idler arms 132 and 142 can cooperate to drive the cable idlers 131 and 141 laterally and inwardly toward a coronal plane of the block to engage one or more cable loops 124 passing through sheaves in the block. The cable idlers 131 and 141 can thus apply a transverse force—toward the coronal plane of the block—into cable loops 124 running through the block below. This transverse force applied to the cable loops 124 by the cable idlers 131 and 141 is balanced by tension on the cable loops 124, which is a function of the weight of the block and the weight of a load carried by the block. Therefore, when the block is unloaded, tension on the cable loops 124 is at a minimum, and the transverse force applied by the cable idlers 131 and 141 drives the adjacent cable loops 124 toward the coronal plane by a maximum distance. However, when the block is loaded (e.g., with a construction material or tool), the added weight of this load on the block increases tension on the cable loops 124, which drives the cable idlers 131 and 141 outwardly from the coronal plane by a combined distance that is a function of this added weight.

Therefore, in this implementation, the positions of the cable idlers 131 and 141—and the relative distance between the cable idlers 131 and 141—may vary as a function of the weight carried by the block. Accordingly, the controller 170 can: read a position of the first cable idler 131 from the first position sensor 136; read a position of the second cable idler 141 from the second position sensor 146; calculate a distance between the cable idlers 131 and 141 based on these positions; subtract a stored tare distance (i.e., the distance between the cable idlers 131 and 141 when the block is unloaded) from this distance to calculate a distance change; and implement a parametric model (e.g., a mathematical function) or a non-parametric model (e.g., a lookup table) to convert this distance change into a weight of the load now carried by the block.

4.1 Cable Idler Geometry

In one implementation, the first cable idler 131 defines a grooved pulley configured to ride along a cable and is mounted to the first idler arm 132 via a bearing, such as a ball, tapered, or needle bearing. Alternatively, because a bearing may exhibit run-out and may therefore induce positional noise in the output of the first position sensor 136 as a function of bearing speed (and therefore as a function of block lift and lower speed), the first cable idler 131 can instead be mounted to the first idler arm 132 via a bushing.

Generally, crane cables may include twisted steel rope, and the first cable idler 131 may function as a "follower" that rides along local high points on a first cable loop 124 as the first cable loop 124 moves past the first cable idler 131 and around a first sheave 122 in the block. Accordingly, the twisted steel rope may induce positional noise—in the output of the first position sensor 136—as a function of cable speed and cable twist as the first cable idler 131 loses contact with one wire in the twisted steel rope and comes into contact with an adjacent wire in the twisted steel rope. Therefore, the first cable idler 131 can define a large diameter (e.g., more than 20 times the diameter of the cable) to increase the area of a contact patch between the cable and the first cable idler 131 and thus reduce positional noise from the first cable idler 131 riding between local ridges of the cable.

Additionally or alternatively, the first cable idler 131 can define a groove of a diameter matched to the diameter of the cable such that the groove maintains contact with the peaks of multiple wires in the twisted steel rope simultaneously, thereby: preventing the first cable idler 131 from "skipping" across individual wires in the first cable loop 124; and thus reducing positional noise in the signal output by the first position sensor 136.

In another implementation, the first cable idler 131 defines a rigid follower configured to rest against the cable. For example, the first cable idler 131 can include a nylon block defining a half-round recess of diameter approximating the diameter of the cable. During operation, the first idler arm 132 can locate the half-round recess against the cable, and the cable can slide along the recess. In this example, the first cable idler 131 can also be lapped against the cable during a bedding-in period to wear the recess to the true geometry of the cable such that the recess maintains contact with multiple wires in the first cable loop 124 simultaneously, thereby: preventing the first cable idler 131 from "skipping" across individual wires in the first cable loop 124; and thus reducing positional noise in the output of the first position sensor 136.

The second cable idler 141 can define a similar geometry.

4.2 Cable Loop Contact

In one implementation, the first and second cable idler 141s contact the same cable loop 124—that is, a first region of a cable loop 124 entering a particular sheave in the crane block 120 and a second region of this cable loop 124 exiting the particular sheave, respectively.

Alternatively, the first and second cable idler 141s can be arranged on the chassis 110 to contact different cable loops 124 passing through the block. More specifically, the first cable idler 131 can contact a first region of a first cable loop 124 entering a first sheave 122 in the crane block 120, and the second cable idler 141 can contact an opposing region of a second cable loop exiting a second sheave 123 in the block. Thus, in this implementation, because two cable loops 124 carry the transverse forces applied by the first and second cable idler 141s rather than a single cable loop 124 as in the foregoing implementation, the transverse force carried by each individual cable loop 124 may be half the transverse force carried by a single cable loop 124 in the foregoing implementation, thereby yielding twice the outward displacement of each idler arm 132 per unit mass loaded onto the block and doubling the force resolution detectable by the system 100 over the foregoing implementation.

4.4 Idler Arm and Position Sensor

In one implementation, the first idler arm 132 is pivotably coupled to the chassis 110; and the first position sensor 136 includes a rotary encoder 137 configured to output relative or absolute changes in angular position of the first idler arm 132 on the chassis 110, which correspond to changes in the transverse position of the first cable idler 131 over the chassis 110 resulting from changes in weight carried by the block.

In a similar implementation shown in FIGS. 1A and 1B, the first idler arm 132 includes: a pivot 133; a first section 134 of a first length and supporting the first cable idler 131; and a second section 135 of a second length greater than (e.g., twice) the first length, extending from the pivot 133, and angularly offset (e.g., by 180°) from the first section 134. In this implementation, the first position sensor 136 can include: a scale 138 (e.g., a glass scale) arranged on a distal end of the second section 135 of the first idler arm 132; and a linear encoder 137 configured to output relative or absolute changes in position of the scale 138 relative to the linear encoder 137, which correspond to changes in the transverse position of the first cable idler 131 over the chassis 110 resulting from changes in weight carried by the block. In this implementation, the extended second section 135 of the first idler arm 132 can function to amplify motion of the first cable idler 131, thereby increasing the force resolution detectable by the system 100.

In another implementation shown in FIG. 2, the first idler arm 132 includes: a linear bearing; and a beam configured to slide within the linear bearing within a sagittal plane of the block and defining a distal end supporting the first cable idler 131. In this implementation, the first position sensor 136 includes: a scale 138 (e.g., a glass scale 138) arranged on the beam; and a linear encoder 137 configured to output relative or absolute changes in linear position of the scale 138 relative to the linear encoder 137, which correspond to changes in the transverse position of the first cable idler 131 over the chassis 110 resulting from changes in weight carried by the block.

The second idler arm 142 and the second position sensor 146 can be similarly configured.

4.5 Springs

The springs 139 and 149 are configured to bias the cable idlers 131 and 141 toward their corresponding cable loops 124. For example, each idler assembly 130 can include a spring 139 in the form of a leaf spring 139, a coil spring 139, or a pneumatic spring 139, etc.

4.6 Redundancy

In one implementation, the system 100 includes multiple pairs of idler assemblies.

In one example, in addition to the first and second idler assemblies described above, the system 100 further includes: a third idler assembly arranged on the ventral end of the chassis 110 adjacent the first idler assembly 130 and including a third cable idler configured to run on a third cable loop (or on a first section of a second cable loop); and a fourth idler assembly arranged on the dorsal end of the chassis 110 adjacent the second idler assembly 140 and including a fourth cable idler configured to run on a fourth cable loop (or on a second section of the second cable loop). Accordingly, the controller 170 can: read positions of the first, second, third, and fourth cable idlers from the first, second, third, and fourth position sensors; calculate a first average of the first and third positions; calculate a second average of the second and fourth positions; calculate a distance between the cable idlers based on a difference between the first average and the second average; subtract a stored tare distance—corresponding to an average distance between these first and second pairs of idler assemblies in an unloaded block condition—from this distance to calculate a distance change; and then implement a parametric model or a non-parametric model to convert this distance change to a weight of the load now carried by the block.

Additionally or alternatively, in this variation, transfer of the weight of a load into cable loops 124 at the block as the load is lifted (e.g., off of the ground or a trailer bed) may produce instantaneous or timeseries distributions of tension across these cable loops that is characteristic of the type of the load. Therefore, the controller 170 can: read timeseries positions of each pair of cable idlers in contact with each cable loop (or timeseries pressures on each cable idler, etc., as described below) as the weight of a load is transferred onto the block and cable loops; access a corpus of template timeseries cable idler positions (or pressures) that represent particular load types; and then implement machine learning (e.g., regression, K-means clustering) to match the set of position (or pressure, etc.) timeseries to a template timeseries—from the corpus of template timeseries—associated with a particular load type. Accordingly, the controller 170 can: estimate the total weight of the object based on peak positions (or pressures, etc.) detected at the cable idlers; and predict a type of the object based on distribution of positions (or pressures, etc.) across the cable idlers—and therefor weights carried by the cable loops—as the object is loaded onto the block.

6. Sensors

As described above, the system 100 can further include a set of sensors arranged in the housing 112 or otherwise supported on the chassis 110. For example, the system 100 can include: a motion sensor 150 (e.g., a gyroscope, accelerometer, magnetometer, and/or IMU) configured to output signals representing accelerations and/or angular velocities of the smart hook; an optical sensor 160 (e.g., a color camera, a depth sensor, a 3D camera, and/or an infrared camera) defining a field of view facing downward below the lifting hook; a geospatial position sensor 136 configured to output its geospatial location; an altimeter configured to output a signal representative of the height of the smart hook; a compass; an RFID reader; a humidity sensor; an infrared camera; an ultrasonic depth sensor; a scanning LIDAR sensor; and/or a wind speed sensor; etc.

For example, the chassis 110 can further include a boom extending outwardly from the housing 112 and configured to support the optical sensor 160. In this example, because the block may exhibit greater tendency to pitch at greater amplitude than to roll, the boom can extend outwardly from the chassis 110 in the coronal plane of the block, thereby exposing the optical sensor 160—arranged on the distal end of the boom—to minimal changes in altitude and orientation relative to a load carried by the block when the block experiences large pitch oscillations.

Additionally or alternatively, an idler assembly 130 in the system 100 can include an idler motion sensor 150 (e.g., a dynamometer, a rotary encoded, a continuous potentiometer) configured to detect motion of the cable idler 131 in this idler assembly 130, from which the controller 170 can interpret a cable loop 124 speed and thus a lift or lower rate of the block based on a quantity of cable loops 124 passing through the block.

In one implementation, the system 100 can leverage information obtained from the set of sensors (e.g., optical sensor 160, motion sensor 150) to interpret load types carried by the crane block 120 during a lift event. In this implementation, the system 100 can: derive an oscillation characteristic (e.g., natural frequency, pitch frequency) for a load carried by the crane block 120 based on a timeseries of motion values read from the motion sensor 150 coupled to the chassis 11o; and compare this oscillation characteristic to predefined oscillation characteristics of load types, in a set of load types, carried by the crane block 120. In this implementation, the system 100 can additionally: extract a set of features from images depicting the load carried by the crane block 120 and captured by an optical sensor 160 coupled to the chassis 11o; identify optical characteristics (e.g., shadows, edges, depth) of the load based on the set of features extracted from these images; and compare these optical characteristics to predefined physical characteristics of load types, in the set of load types, carried by the crane block 120.

In one example of this implementation, the system 100 includes an optical sensor 160: coupled to the chassis 11o; and defining a field of view facing downward below the crane block 120. In this example, the controller 170 can, during the lift event: access a first image depicting the load (i.e., depicted fully or partially in the first image) carried by the crane block 120 from the optical sensor 160; detect the load in a first region of the first image; extract a first set of features (e.g., shadows, edges, depth) from the first region of the first image; and interpret the load type, from the set of load types, for the load carried by the crane based on the first set of motion values and the first set of features extracted from the first image.

The controller 170 can thus, implement machine learning techniques (e.g., regression, K-means clustering) to match the oscillation characteristic and the optical characteristics of the load carried by the crane block 120 to a particular load type, in a set of load types, exhibiting these characteristics.

7. Battery and Energy Harvesting

The system 100 further includes a battery arranged in the housing 112 and configured to supply power to the foregoing sensors and the controller 170.

In one variation, the system 100 further includes a set of solar panels arranged on the housing 112, configured to capture solar energy, and configured to output electrical energy to maintain a state of charge of the battery.

Additionally or alternatively, the system 100 can include a generator: coupled to one or both cable idlers 131 and 141; configured to convert mechanical rotation of the cable idlers 131 and 141—resulting from motion of the cable loops 124 through the block—into electrical energy; and configured to output this electrical energy to maintain a state of charge of the battery.

8. Assembly

The system 100 can be assembled from multiple components onto an existing block in order to enable load detection and recognition without (substantive) disassembly of the block.

In one example, vertical sections of the chassis 110 define discrete structural (e.g., formed or cast steel) members that are first assembled over the ends of the center pin 116 that extend through the outer side plates 125 of the block. Tie bolts are then installed laterally through the distal ends of the cage members 118—extending fore and aft from the eyelets defined by the vertical sections of the chassis 110—and are shimmed to apply limited compression of the eyelets against the side plates 125 of the block or to otherwise maintain location of the eyelets over the center pin 116. In this example, the housing 112 defines a clamshell structure that is assembled around cable loops 124—running around sheaves in the block—and is fixedly or pivotably fastened to the vertical sections of the chassis no.

In this example, the springs 139 and 149 of the idler assemblies are then compressed. The idler arms 132 and 142, cable idlers 131 and 141, and compressed springs 139 and 149 are mounted to the housing 112. The springs 139 and 149 are then released to bias the cable idlers 131 and 141 against their corresponding cable loops 124. A control module—including the controller 170, battery, wireless communication module, and/or other sensors—is then installed on the housing 112 and connected to the position sensors 136 and 146 in the idler assemblies to complete the installation (or "retrofit") on the extant block.

Alternatively, the foregoing elements of the system 100 can be integrated into the block during original manufacture of the block.

9. Variation: Force Sensor/Tension Meter

In one variation, rather than an idler arm 132 movably (e.g., pivotably) coupled to the chassis 110 and a position sensor 136 configured to detect changes in position of the idler arm 132, each idler assembly 130 instead includes: a cable idler 131; a fixed idler arm 132 rigidly mounted to the chassis 110 and locating the cable idler 131 against a cable; and a force sensor 180 (e.g., a strain gauge, a load cell, a force-sensing resistor) configured to detect a force carried from the idler arm 132 into the chassis 11o, which corresponds to a transverse force applied by the cable idler 131 into the cable.

In a similar variation, each idler assembly 130 includes: a frame arranged over a particular sheave of the crane hook 126; a force sensor 180 (e.g., a strain gauge, a load cell, a force-sensing resistor) mounted to the frame; a cable idler 131 supported on the force sensor 180 and engaging a cable loop 124 passing through the particular sheave; and a secondary sheave mounted to the frame above the cable idler 131 and opposite the sheave of the crane hook 126 and cooperating with the sheave of the crane hook 126 to guide the cable loop 124 through the cable idler 131.

Therefore, in these variations, each idler assembly 130 can form a tension meter configured to detect a tension on a section of cable loop 124 above the block.

Accordingly, in these variations, the controller 170 can: read a first force from a first force sensor 180 of a first idler assembly 13o; read a second force from a second force sensor 180 of a second idler assembly 140 opposite the first idler assembly 130; sum the first and second forces to calculate a combined traverse force carried by the idler assemblies; subtract a stored tare force—corresponding to combined force detected by the force sensors 180 when the block is unloaded—from the combined traverse force to calculate a force difference; and implement a parametric model or a non-parametric model to convert this force difference to a weight of the load.

In this variation, during assembly of the system 100 onto the block, the idler arms 132 and 142 can be installed on the chassis 110 in a retracted position. The idler arms 132 and 142 can then be extended to drive their cable idlers 131 and 141 into contact with the adjacent cable sections. For example, the idler arms 132 and 142 can be mounted to the chassis 110 by a set of turnbuckles, and the turnbuckles can be adjusted to: extend the cable idlers 131 and 141 into contact with adjacent cable sections; and preload the cable idlers 131 and 141 against these cable sections, such as with a nominal combined transverse preload of 500 pounds in order to: ensure consistent contact between the cable idlers 131 and 141 and the cable loops 124; and support the chassis 110 over the block during operation.

(Alternatively, in this variation: the idler assemblies can include movable idler arms 132 and 142 biased toward the cables by springs 139 and 149; the force sensors 180 can be arranged between the springs 139 and 149 and the force sensors 180; and the idler assemblies can be installed on the chassis 110 and driven into contact with the cable loops 124 as described above.)

10. Controller

Generally, the controller 170 is configured: to sample the position sensors 136 and 146 (and/or the force sensor 180(s), load cell(s)), the motion sensor 150, the optical sensor 160, and the geospatial position sensor 136, etc.; and to transform these signals into lifting event records representing objects loaded onto, lifted by, moved by, and unloaded from the block.

In one implementation, once the system 100 is installed on the block during a setup period, the block can be unloaded and lifted off of a ground or support surface. Once lifted, the controller 170 can: sample the position sensors 136 and 146 in the idler assemblies; record timeseries outputs from the sensors; implement a bandpass filter to remove low-frequency components (e.g., pendulum motion of the block) and high-frequency components (e.g., cable idlers 131 and 141 skipping across individual wires in the cable loops 124) from these sensor signals; extract average or equilibrated cable idler 131 positions output by these sensors; and store a combination of these outputs (e.g., a total cable idler 131 offset distance) as a tare offset distance—between the cable idlers 131 and 141—that represents an unloaded condition at the block. The block can then be loaded with known weights (e.g., ½ ton, 2 ton, and 10 ton weights), and the controller 170 can repeat this process to calculate offset distances between the cable idlers 131 and 141 for each of these known weights. The controller 170 can then implement regression or other techniques to calculate a parametric function—that converts offset distance between the cable idlers 131 and 141 to force carried by the block—based on these known weights and their corresponding cable idler 131 offset distances.

Later, during operation, the controller 170 can: sample the position sensors 136 and 146 in the idler assemblies; record timeseries outputs from the sensors; implement a bandpass filter to remove low- and high-frequency components from these sensor signals; detect equilibration of the outputs of these sensors; store equilibrated cable idler 131 positions; calculate a total cable idler 131 offset distance based on a combination of these equilibrated cable idler 131 positions; subtract the tare offset distance from this total cable idler 131 offset distance; and pass this result into the parametric model to convert this result into a weight carried by the block, as shown in FIG. 2.

In one example, the controller 170 can initiate a weight calibration cycle (e.g., via an input received by a crane operator prior to the lift event). During a first time period in the weight calibration cycle, the controller 170 can: read a first timeseries of position values from the position sensor 136 over the first time period representing absence of the load carried by the crane block 12o; extract an average position for the first cable idler 131 from the timeseries of position values; and generate an unloaded weight profile for the crane block 120 based on the average position for the first cable idler 131.

Furthermore, in this example, during a second time period following the first time period in the weight calibration cycle, the controller 170 can: read a second timeseries of position values from the position sensor 136 over the second time period representing presence of a calibration load at the crane block 120 of a particular weight; and derive a first offset distance from the average position based on the second timeseries of position values and the unloaded weight profile.

The controller 170 can thus: generate a first function converting the first offset distance to the particular weight of the calibration load; and store the first function in a set of functions representing conversions of offset distances to weights of loads carried by the crane block 120.

In another example, the controller 170 can initiate a motion calibration cycle (e.g., via an input received by a crane operator prior to the lift event). During a first time period in the motion calibration cycle, the controller 170 can: read a first timeseries of motion values from the motion sensor 150 over the first time period representing absence of the load carried by the crane block 120; derive a natural frequency for the crane block 120 based on the first timeseries of motion values; and generate an unloaded frequency profile for the crane block 120 based on the natural frequency for the crane block 120.

Furthermore, in this example, during a second time period following the first time period in the motion calibration cycle, the controller 170 can: read a second time series of motion values from the motion sensor 150 over the second time period representing presence of a calibration load at the crane block 120 of a particular load type; derive a first frequency profile for the calibration load of the particular load type based on the second timeseries of motion values and the unloaded frequency profile; and store the first frequency profile in a set of frequency profiles representing frequency profiles of load types, in the set of load types, carried by the crane block 120 during lifting events.

The controller 170 can thus, retrieve the set of frequency profiles during the lift event to accurately interpret the load type of the load carried by the crane based on motion values read from the motion sensor 150.

In a similar implementation of the system 100 in which the idler assemblies include force sensors 180, the controller 170 can: sample the force sensors 180 in the idler assemblies once the block is lifted; record timeseries outputs from the sensors; implement a bandpass filter to remove low- and high-frequency components from these sensor signals; extract average or equilibrated force outputs of these sensors; and store a combination of these outputs (e.g., a sum of these forces) as a tare force that represents an unloaded condition at the block. The block can then be loaded with known weights (e.g., ½ ton, 2 ton, and 10 ton weights), and the controller 170 can repeat this process to calculate combined forces on the cable idlers 131 and 141 resulting from loading of these known weights onto the block. The controller 170 can then implement regression or other techniques to calculate a parametric function—that converts combined force on the cable idlers 131 and 141 into force carried by the block—based on these known weights and their corresponding combined cable idler 131 forces.

Later, during operation, the controller 170 can: sample the force sensors 180 in the idler assemblies; record timeseries outputs from the sensors; implement a bandpass filter to remove low- and high-frequency components from these sensor signals; detect equilibration of the outputs of these sensors; calculate an average combined cable idler 131 force represented in these sensor signals during this equilibrated period; subtract the tare force from this combined cable idler 131 force; and pass this result into the parametric model to convert this result into a weight carried by the block.

However, the controller 170 can implement any other method or technique to interpret a weight carried by the block based on outputs of one or more sensors in the system 100.

The controller 170 can then implement methods and techniques described in U.S. patent application Ser. No. 17/033,579 to predict or identify a type of the load and to compile these and other data into a lift event record for the load.

10.1 Predicted Weight Range

In one implementation, the system 100 can leverage the data obtained from the set of sensors integrated into the chassis 110 in order to interpret a weight range of a particular degree of confidence for the load carried by the crane block 120. In this implementation, the weight predicted for the load carried by the crane block 120 based on position values of the position sensors 136 and 146 is predicted within the weight range of the particular degree of confidence (e.g., plus or minus 10 kg). By leveraging data obtained from other sensors in the system, the system 100 can predict the weight carried by the crane block 120 within weight ranges of increasing degrees of confidence (e.g., plus or minus 5 kg).

In one example, during a lift event, the controller 170 can: read a first set of motion values from the motion sensor 150 coupled to the chassis 110; derive a frequency profile for the load carried by the crane block 120 based on the first set of motion values; and generate a first weight range of a first degree of confidence based on the frequency profile of the load type carried by the crane block 120 interpreted from the first set of motion values.

The controller 170 can thus, predict the weight of the load carried by the crane based on the first position value from the first position sensor 136 and within the first weight range of the first degree of confidence for the load type carried by the crane.

Alternatively in this example, the system 100 may predict the weight of the load carried by the crane as deviating from the first weight range (i.e., the predicted weight value is lower than the lowest value of the first weight range or greater than the highest value of the first weight range) of the first degree of confidence, such as, as a result of a position sensors 136 and 146 requiring calibration for further operation. In response to the predicted weight deviating from this weight range, the system 100 can generate a prompt for a user to perform a weight calibration cycle prior to further operation of the crane block 120.

Furthermore, in the aforementioned example, the system 100 can leverage data obtained from an optical sensor 160 coupled to the chassis 110 and defining a field of view facing downward below the crane block 120 to reduce the weight range derived from the frequency profile and thereby increasing the degree of confidence for the weight predicted for the load carried by the crane block 120.

In this example, the controller 170 can: access a first image depicting the load carried by the crane block 120 from the optical sensor 160; detect the load in a first region of the first image; and extract a first set of features (e.g., shadows, edges, depth) from the first region of the first image. The controller 170 can thus generate a second weight range of a second degree of confidence greater than the first degree of confidence based on the first set of features from the first region of the first image.

The system 100 can therefore compare the predicted weight of the load carried to the second weight range of the second degree of confidence and thus in response to the predicted weight of the load deviating from this second weight range of the second degree of confidence, generate the lift event recording including the weight of the load at the second degree of confidence. Alternatively, in response to the predicted weight of the load carried by the crane block 120 in agreement with the first weight range of the first degree of confidence and deviating from the second weight range of the second degree of confidence, generate a prompt for initiating a weight calibration cycle prior to further operation of the crane block 120.

10.2 Motion Characteristics

In one implementation of the system 100, the controller 170 can: read a time series of position values from the first position sensor 146 of the first idler assembly 140 during loading of the crane block 12o; and derive an oscillation characteristic of the load carried by the crane block 120 based on these time series of position values. In this implementation, the controller 170 can then, following the loading of the crane block 120: read a first position value from the first idler assembly 13o; read a second position value from the second idler assembly 140; interpret a distance between the first cable idler 131 and the second cable idler 141 based on these position values; and predict the weight of the load based on this distance between the first cable idler 131 and the second cable idler 141.

Therefore, in this implementation, the system 100 can derive motion characteristics and weight characteristics of the load carried by the crane block 120 based on the first and second idler assemblies 130 and 140.

For example, during loading of a steel beam on the crane block 120, the steel beam will begin to sway and periodically oscillate while suspended by the crane block 120 during this loading event. The swaying motion and oscillating motion of the steel beam will correspond to periodic changes of transverse position of the first and second cable idler 131 and 141 during loading of the crane block 120. In the foregoing example, the controller 170 can: record a timeseries of position values from the first position sensor 136 during loading of the steel beam; derive a pitch frequency for the steel beam based on these timeseries of position values; and derive a natural frequency of the steel beam based on these timeseries of position values. The controller 170 can then store the pitch frequency and natural frequency for the steel beam in a beam model for identifying load types carried by crane block 120.

Therefore, the system 100 can: derive motion characteristics of loads carried by the crane block 120 based on position values obtained from the idler assembly 130; and interpret a load type for the load carried by the crane block 120 based on the motion characteristics.

10.2 Crane Block Failure

In one implementation, the system 100 can leverage data obtained from the set of sensors integrated into the chassis 110 to: detect anomalies within this obtained data in order to interpret a failure condition for the crane block 120; generate prompts to inspect a predicted origin of the failure condition prior to further operation of the crane block 120; and serve these prompts to users (e.g., supervisors, site managers) within the construction site, such as, via mobile devices, local computer devices, and remote computer devices.

In one example the controller 170 can, during the lift event: detect abrupt changes in position values from the position sensors 136 and 146; detect a baseline position value from the position sensor 136 during transportation of a load by the crane block 120; and detect absence of position values output by the position sensor 136. The system 100 can therefore, interpret these anomalies as corresponding to a failure condition, such as the cable idler 131 being de-coupled from the cable loop 124 during operation of the crane block 120, and/or the load carried by the crane block 120 de-coupling from the hook of the crane block 120; and/or weather conditions preventing ideal operation of the crane block 120 at the construction site. The system 100 can generate prompts to inspect a source on the crane block 120 predicted as being the origin for these anomalies and/or generate prompts to cease operation of the crane block 120 to prevent harm to construction workers at the construction site.

Additionally and/or alternatively, the system 100 can detect anomalous characteristics for the load carried by the crane block 120 based on data obtained from motion values output by the motion sensor 150 and/or visual features extracted from images output by an optical sensor 160 depicting the load carried by the crane block 120.

11. Retrofit System: Replacement Center Pin

In one variation, rather than or in addition to the idler assemblies described above, the system 100 includes a sensing-enabled center pin 116: defining a load-carrying capacity approximating the capacity of the block; defining a sheave interface and mounting geometries approximating the geometry of an original center pin 116 of the block; including a sensor 117 configured to output a signal corresponding to a force carried by the sensing-enabled center pin 116; and configured to install in the block in place of the original center pin 116.

For example, the sensing-enabled center pin 116 can include: a center section configured to carry the set of sheaves 121 in the block; a head on a first end of the center section; a set of (e.g., three) sensor recesses arranged at equidistant radial positions about the center section; and a set of force sensors 117 (e.g., strain gauges) installed in the sensor recesses and coupled to a set of leads running through the center of the sensing-enabled center pin 116 and out of the head. During installation, an operator may: install a control module—including the controller 170, battery, wireless communication module, and/or other sensors—directly on the block (e.g., with a threaded fastener, magnet, clamp, or adhesive); replace the original center pin 116 with the sensing-enabled center pin 116; and connect the leads to a receptacle in the control module to connect the force sensors 117 to the controller 170.

In a similar variation, the system 100 includes a sensing-enabled center pin 116 assembly including: a replacement center pin 116; and a set of force-sensing collars 117. In this variation, the replacement center pin 116 can: define a load-carrying capacity approximating the capacity of the original center pin 116 of the block; include a center section configured to carry the set of sheaves 121 in the block; and include undersized shoulders on both ends of the center section. Each force-sensing collar can be configured to seat over the undersized shoulders of the replacement center pin 116 and to seat in center pin 116 bearings on the side plates 125 of the block. Each force-sensing collar can also include integrated force sensors 117 (e.g., strain gauges) configured to output signals corresponding to the force carried from the replacement center pin 116 into the collar. In this implementation, during installation, the operator may: replace the original center pin 116 with the replacement center pin 116; install the collars over both ends of the replacement center pin 116 to support the ends of the replacement center pin 116 on the side plates 125 of the block; and connect leads extending from the collars to a receptacle in the control module to connect the force sensors 117 to the controller 170.

Thus, in this variation, the controller 170 can read the force carried by the block directly from force sensors 117 in the sensing-enabled center pin 116 or sensing-enabled center pin 116 assembly.

12. Retrofit System: Load Cell at Hook Trunnion

Additionally or alternatively, the system 100 can include a load cell or force sensor 180 arranged between a hook trunnion 128 and a hook nut in the base of the block.

For example, the system 100 can include an annular load cell (or a circular array of strain gauges, etc.) arranged between: the hook trunnion 128; and a thrust bearing seated under the hook nut in the base of the block. In this example, an operator may: remove a retaining pin from the hook nut; remove the hook nut and thrust bearing from the hook; install the annular load cell over the threaded end of the hook; reinstall the thrust bearing and hook nut; drill a new pilot for the retaining pin in the threaded end of the hook and reinstall the retaining pin through the hook and hook nut; and connect a lead extending from the load cell to a receptacle in the control module to connect the load cell to the controller 170.

In a similar variation, the system 100 includes a replacement hook trunnion 128 and a force sensor 180 integrated into the replacement hook trunnion 128. For example, in this implementation, an operator may: loosen or disassemble the side plates 125 of the block to release the extant hook trunnion 128; transfer the hook, hook nut, and thrust bearing to the replacement hook trunnion 128 such that the thrust bearing seats over the force sensor 180; seat the replacement hook trunnion 128 between the side plates 125; tighten or reassemble the side plates 125 and center pin 116; and connect a lead extending from the load cell to a receptacle in the control module to connect the force sensor 180 to the controller 170.

13. Lift Event Record Generation

In one implementation, the controller 170 can generate lift event records, select or define load handling specifications, select of define buffer distances, and selectively issue object motion alarms based on data collected by a set of sensors integrated onto the chassis 110 mounted on the crane block 120. The controller 170 can then: transmit lift event records to a local computing device (e.g., a device associated with a supervisor of a construction site) and/or to a remote computer system 100 for storage, generate a construction activity timeline based on these lift event records; and transmit alarms to a crane operator panel, site manager, etc.

In another implementation, the system 100 can transmit the data collected by the set of sensors integrated onto the chassis 110 mounted on the crane block 120 to a remote computer system. The remote computer system 100 can then generate these lift event records and distribute them to various devices (e.g., supervisor device, foreman device) proximal the construction site.

For example, the system 100 can record and transmit this data to a local wireless gateway over a wireless network. The wireless gateway—such as mounted to the housing 112 of the chassis 110—can then return this data to a remote computer system 100 (e.g., a remote server) via a computer network. Alternatively, the smart hook can transmit this data directly to the remote computer system, such as via a cellular network. The remote computer system 100 can then remotely generate lift event records and trigger alarms for the construction site.

In another example, the system 100 transmits data to a local computing device located on the construction site—such as a desktop computer, laptop computer, or mobile device—via a local wireless network; and the local computing device can then generate the lift event records for the construction site.

The system 100 can therefore, in (near) real-time automatically generate lift event records to track progress of the construction site and issue alarms for materials and equipment moved throughout the construction site by a crane.

14. Variation: Photonic Sensor

In one implementation, in addition to the position sensor 136, the system 100 further includes: a light source 190 (e.g., a laser, alpha ray emitter, gamma ray emitter) arranged on the chassis 110 directed toward the first idler arm 132 and configured to emit beams of light to the first idler arm 132; and a photonic sensor (e.g., a silicon photonic sensor) arranged on the idler arm 132 and configured to receive the beams of light emitted from the light source 190 and output electrical values corresponding to changes in the transverse position of the first cable idler 131 over the chassis 110 resulting from changes in weight carried by the crane block 120.

Thus, in the foregoing implementation, the controller 170 can: read a set of electric values from the photonic sensor; detect a first phase shift of a first beam emitted from the light source 190 to the photonic sensor 192 based on the set of electrical values; predict the weight of the load carried by the crane block 120 based on a combination of the first position value and the first phase shift.

In this implementation, the predicted weight for the load carried by the crane block 120 based on the position values output by the position sensor 136 correspond to a predicted weight within a weight range of a first degree of confidence (e.g., up to hundredths of kilograms). Alternatively, the predicted weight based on the electrical values output by the photonic sensor can correspond to a predicted weight within a weight range of a second degree of confidence greater than the first degree of confidence (e.g., up to tenths of kilograms). For example, a steal beam carried by the crane block 120 during the lift event can have a weight of 122 kilograms. In this example, during lifting of the steel beam by the crane block 120, the system 100 can output a predicted weight of 100 kilograms derived from the position values read from the position sensor 136. The system 100 can then read a set of electrical values from the photonic sensor to output a predicted weight of 120 kilograms based on this set of electrical values.

The system 100 can therefore predict the weight of the load carried by the crane block 120 to a target degree of confidence and generate the lift event record containing the weight of the load at the target degree of confidence. In one variation of this implementation, the system 100 can leverage a combination of photonic sensors 139 and position sensors 136 to predict an accurate weight for the load carried by the crane block 120.

In another example, during operation of the crane block 120, the controller 170 can, during a first time period, predict the weight of the load carried by the crane block 120 within a first weight range of a first degree of confidence based on deviations of the first position value from a baseline position value. During a second time period following the first time period and in response to receiving an input from a user to increase a degree of confidence for the weight of the load carried by the crane block 120, the controller 170 can then: read a time series of electrical values from the photonic sensors; and detect a phase shift of a first beam emitted from the light source 190 to the photonic sensor 192 based on the time series of electrical values. Thus, the system 100 can predict the weight of the load carried by the crane block 120 within a second weight range of a second degree of confidence greater than the first degree of confidence based on the phase shift detected in the time series of electrical values.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for tracking lifting events at a construction site comprising:
    a chassis:
        configured to couple to a crane block of a crane at a construction site; and
        located over a set of sheaves and side plates of the crane block;
    a first idler assembly comprising:
        a first cable idler;
        a first idler arm:
            supporting the first cable idler on a first side of the chassis; and
            biasing the first cable idler inwardly toward a first cable loop coupled to a first sheave in the set of sheaves of the crane block; and
        a first position sensor coupled to the first idler arm;
    a motion sensor coupled to the chassis; and
    a controller configured to, during a lift event:
        read a first set of motion values from the motion sensor;
        interpret a load type, from a set of load types, for the load carried by the crane based on the first set of motion values;
        read a first position value from the first position sensor;
        predict a weight of the load carried by the crane block based on the first position value; and
        generate a lift event record containing the load type and the weight of the load carried by the crane block.

2. The system of claim 1:
further comprising a second idler assembly comprising:
  a second cable idler;
  a second idler arm:
    supporting the second cable idler on a second side of the chassis opposite the first side of the chassis; and
    biasing the second cable idler inwardly toward a second cable loop coupled to a second sheave in the set of sheaves; and
  a second position sensor coupled to the second idler arm; and
wherein the controller is configured to, during the lift event:
  read a second position value from the second position sensor; and
  predict the weight of the load carried by the crane hook based on the first position value and the second position value.

3. The system of claim 2, wherein the controller is configured to, during the lift event:
access a baseline tare distance value between the first cable idler and the second cable idler;
calculate a first distance value between the first cable idler and the second cable idler based on the first position value and the second position value;
calculate a distance change between the first distance value and the baseline tare distance value; and
predict the weight of the load carried by the crane hook based on the distance change.

4. The system of claim 1:
further comprising an optical sensor:
  coupled to the chassis; and
  defining a field of view facing downward below the crane block; and
wherein the controller is configured to, during the lift event:
  access a first image depicting the load carried by the crane block from the optical sensor;
  detect the load in a first region of the first image;
  extract a first set of features from the first region of the first image; and
  interpret the load type, from the set of load types, for the load carried by the crane based on the first set of motion values and the first set of features extracted from the first image.

5. The system of claim 1, wherein the controller is configured to, during a weight calibration cycle:
during a first time period:
  read a first timeseries of position values from the position sensor over the first time period representing absence of the load carried by the crane block;
  extract an average position for the first cable idler from the timeseries of position values; and
  generate an unloaded weight profile for the crane block based on the average position for the first cable idler; and
during a second time period following the first time period:
  read a second timeseries of position values from the position sensor over the second time period representing presence of a calibration load at the crane block of a particular weight;
  derive a first offset distance from the average position based on the second timeseries of position values and the unloaded weight profile;
  generate a first function converting the first offset distance to the particular weight of the calibration load; and
  store the first function in a set of functions representing conversions of offset distances to weights of loads carried by the crane block.

6. The system of claim 1, wherein the controller is configured to, during a motion calibration cycle:
during a first time period:
  read a first timeseries of motion values from the motion sensor over the first time period representing absence of the load carried by the crane block;
  derive a natural frequency for the crane block based on the first timeseries of motion values; and
  generate an unloaded frequency profile for the crane block based on the natural frequency for the crane block; and
during a second time period following the first time period:
  read a second time series of motion values from the motion sensor over the second time period representing presence of a calibration load at the crane block of a particular load type;
  derive a first frequency profile for the calibration load of the particular load type based on the second timeseries of motion values and the unloaded frequency profile; and
  store the first frequency profile in a set of frequency profiles representing frequency profiles of load types, in the set of load types, carried by the crane block during lifting events.

7. The system of claim 1:
wherein the first cable idler defines:
  a first pulley configured to ride along the first cable and mounted to the first idler arm;
  a first idler diameter greater than a diameter of the first cable configured to increase an area of contact between the first cable and the first cable idler; and
  a first groove of a first groove diameter matching the diameter of the first cable configured to maintain contact with a first region of the first cable loop; and
wherein the first idler assembly further comprises a first spring configured to bias the first cable idler toward the first cable loop.

8. The system of claim 1:
wherein the first idler arm is pivotably coupled to the first side of the chassis and comprises:
  a pivot;
  a first section of a first length and supporting the first cable idler; and
  a second section of a second length greater than the first length, extending from the pivot, and angularly offset from the first section;
wherein the first position sensor comprises:
  a scale arranged on a distal end of the second section of the first idler arm; and
  a linear encoder configured to output changes in position of the scale relative to the linear encoder, corresponding to changes in transverse position of the first cable idler over the chassis resulting from changes in weight carried by the crane block; and
wherein the controller is configured to, during the lift event:
  access a baseline linear position value for the linear encoder representing absence of a load carried by the crane block;

read a first linear position value from the linear encoder of the first position sensor;

calculate a first difference between the baseline linear position value and the first linear position value; and predict the weight of the load carried by the crane block based on the first difference.

9. The system of claim 1:

wherein the first idler arm is pivotably coupled to the first side of the chassis;

wherein the first position sensor comprises a rotary encoder configured to output changes in angular position of the first idler arm on the chassis corresponding to changes in the transverse position of the first cable idler over the chassis resulting from changes in weight carried by the crane block; and wherein the controller is configured to, during the lift event:

access a baseline angular position value for the rotary encoder representing absence of a load carried by the crane block;

read a first angular position value from the rotary encoder of the first position sensor;

calculate a first difference between the baseline angular position value and the first angular position value; and predict the weight of the load carried by the crane block based on the first difference.

10. The system of claim 1, wherein the controller is configured to, during the lift event:

derive a frequency profile for the load carried by the crane block based on the first set of motion values;

generate a first weight range of a first degree of confidence based on the frequency profile of the load type carried by the crane block interpreted from the first set of motion values; and predict the weight of the load carried by the crane based on the first position value from the first position sensor and within the first weight range of the first degree of confidence for the load type carried by the crane.

11. The system of claim 10:

further comprising an optical sensor:
coupled to the chassis; and
defining a field of view facing downward below the crane block; and wherein the controller is configured to, during the lift event:

access a first image depicting the load carried by the crane block from the optical sensor;

detect the load in a first region of the first image;

extract a first set of features from the first region of the first image;

generate a second weight range of a second degree of confidence greater than the first degree of confidence based on the first set of features from the first region of the first image; and generate a prompt for initiating a weight calibration cycle in response to the weight predicted for the load carried by the crane block in agreement with the first weight range of the first degree of confidence and deviating from the second weight range of the second degree of confidence.

12. The system of claim 1:

further comprising a second idler assembly comprising:
a second cable idler configured to ride along the first cable loop and mounted to the first idler arm;

a second idler arm mounted to the chassis and locating the second cable idler against a second cable loop coupled to a second sheave in the set of sheaves of the crane block; and a force sensor coupled to the second idler arm and configured to detect a force carried from the second idler arm into the chassis; and wherein the controller is configured to, during the lifting event:

read a first force value from the force sensor;

calculate a force difference between the first force value and a baseline force value for the load carried by the crane block; and access a first force function for converting the force difference to weight; and predict the weight of the load carried by the crane block based on the force function for the force difference.

13. The system of claim 1:

wherein the first idler assembly further comprises:

a first light source arranged on the chassis directed toward the first idler arm and configured to emit beams of light to the first idler arm; and a first photonic sensor arranged on the idler arm and configured to receive the beams of light emitted from the first light source and output electrical values corresponding to changes in the transverse position of the first cable idler over the chassis resulting from changes in weight carried by the crane block; and wherein the controller is configured to, during the lift event:

read a set of electric values from the photonic sensor;

detect a first phase shift of a first beam emitted from the first light source to the first photonic sensor based on the set of electrical values; and predict the weight of the load carried by the crane block based on a combination of the first position value and the first phase shift.

14. The system of claim 13:

wherein the first idler assembly further comprises:

a first light source arranged on the chassis directed toward the first idler arm and configured to emit beams of light to the first idler arm; and a first photonic sensor arranged on the idler arm and configured to receive the beams of light emitted from the first light source; and wherein the controller is configured to, during the lift event:

during a first time period, predict the weight of the load carried by the crane block within a first weight range of a first degree of confidence based on deviations of the first position value from a baseline position value; and during a second time period following the first time period and in response to receiving an input from a user to increase a degree of confidence for the weight of the load carried by the crane block:

read a time series of electrical values from the photonic sensors;

detect a phase shift of a first beam emitted from the first light source to the first photonic sensor based on the time series of electrical values; and predict the weight of the load carried by the crane block within a second weight range of a second degree of confidence greater than the first degree of confidence based on the phase shift detected in the time series of electrical values.

15. A system for tracking lifting events at a construction site comprising:
a chassis:
configured to couple to a crane block of a crane at a construction site; and
located over a set of sheaves and side plates of the crane block;
a set of idler assemblies, each idler assembly comprising:
a cable idler;
an idler arm:
supporting the cable idler on a side of the chassis; and
biasing the cable idler inwardly toward a cable loop coupled to a sheave in the set of sheaves of the crane block; and
a position sensor coupled to the idler arm configured to output position values of the idler arm;
a motion sensor coupled to the chassis; and
a controller configured to, during a lift event:
read a set of position values from the position sensor of each idler assembly in the set of idler assemblies;
predict a weight of a load carried by the crane block based on the set of position values;
read a first set of motion values from the motion sensor;
interpret a load type, from a set of load types, for the load carried by the crane based on the first set of motion values; and
generate a lift event record containing the load type and the weight of the load carried by the crane block.

16. The system of claim 15, wherein the controller is configured to, during the lift event:
access a baseline tare distance value between the cable idlers of each idler assembly in the set of idler assemblies;
calculate a first distance value between the cable idler of each idler assembly in the set of idler assemblies based on the set of position values;
calculate a distance change between the first distance value and the baseline tare distance value; and
predict the weight of the load carried by the crane hook based on the distance change.

17. The system of claim 15:
wherein the idler arm of each idler assembly in the set of idler assemblies is coupled to opposite sides of the chassis and comprises:
a pivot
a first section of a first length and supporting the cable idler; and
a second section of a second length greater than the first length, extending from the pivot, and angularly offset from the first section;
wherein the position sensor of each idler assembly in the set of idler assemblies comprises:
a scale arranged on a distal end of the second section of the first idler arm; and
an encoder configured to output changes in position of the scale relative to the encoder, corresponding to changes in transverse position of the first cable idler over the chassis resulting from changes in weight carried by the crane block; and
wherein the controller is configured to, during the lift event;
access a baseline position value for each encoder of the set of idler assemblies representing absence of a load carried by the crane block;
read a first position value from each of the encoder of the set of idler assemblies of the first position sensor;
calculate a first difference between the baseline position value and the first position value; and
predict the weight of the load carried by the crane block based on the first difference.

18. The system of claim 15:
wherein the chassis comprises:
a housing;
a first vertical section extending downwardly from the housing and defining a first eyelet configured to couple to a first side of a center pin extending through a first side plate of the crane block;
a second vertical section extending downwardly from the housing and configured to couple to a second side of the center pin extending through a second side plate of the crane block opposite the first side plate; and
a cage:
extending horizontally about the crane block; and
coupled to a first distal end of the first vertical section and a distal second distal end of the second vertical section; and
wherein the idler arm for each idler assembly, in the set of idler assemblies:
is pivotably coupled to the cage;
extends upwardly from the cage;
supports the cable idler on a distal end of the idler arm; and
comprises a spring configured to bias the cable idler toward the cable loop.

19. The system of claim 15
further comprising a center pin:
arranged within the crane block and defining a load capacity for the crane block;
defining a sheave interface for the set of sheaves of the crane block; and
comprising a force sensor configured to output load values corresponding to forces carried by the center pin;
the controller is configured to, during the lift event:
read a first time series of load values from the force sensor;
detect a peak load in the first time series of load values;
predict the weight of the load carried by the crane block based on a combination of the peak load in the first time series of load values and the set of position values from the set of idler assemblies.

20. A system for tracking lifting events at a construction site comprising:
a chassis configured to couple to a crane block of a crane at a construction site;
a cable idler coupled to the chassis;
a spring biasing the cable idler inwardly toward a cable loop coupled to a sheave of the crane block;
a position sensor coupled to the idler arm and comprising:
a scale arranged on a distal end of the idler arm; and
an encoder configured to output position values of the scale corresponding to changes in transverse position of the first cable idler over the chassis resulting from changes in weight carried by the crane block; and
a controller configured to, during a lift event:
read a first position value from the first position sensor;
predict a weight of a load carried by the crane block based on deviation of the first position value from a baseline position value; and generate a lift event record containing the weight of the load carried by the crane block.

* * * * *